H. S. BROWN.
STEAM COOKER.
APPLICATION FILED JULY 21, 1921.
1,430,532.
Patented Oct. 3, 1922.
2 SHEETS—SHEET 1.
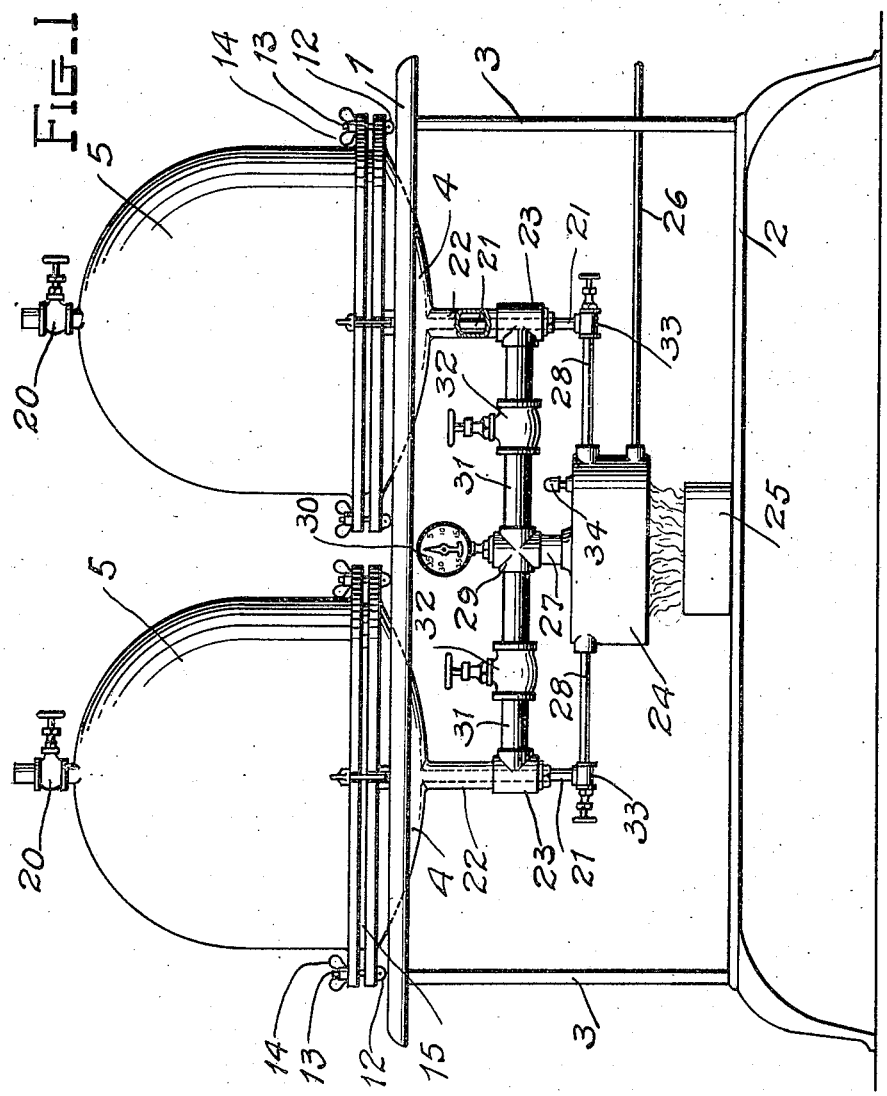
Inventor
Howard S. Brown
By [signature]
Attorneys H. S. BROWN.
STEAM COOKER.
APPLICATION FILED JULY 21, 1921.
1,430,532.
Patented Oct. 3, 1922.
2 SHEETS—SHEET 2.
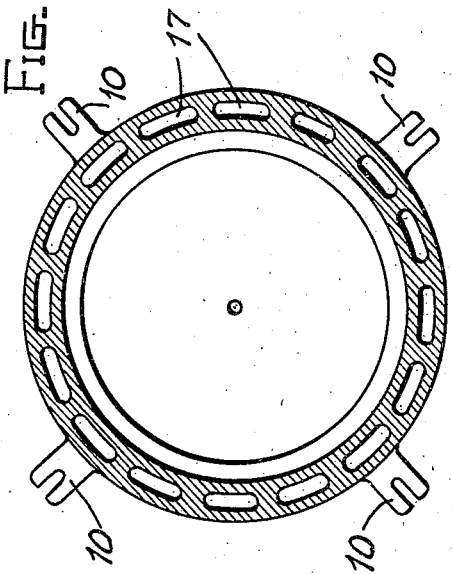
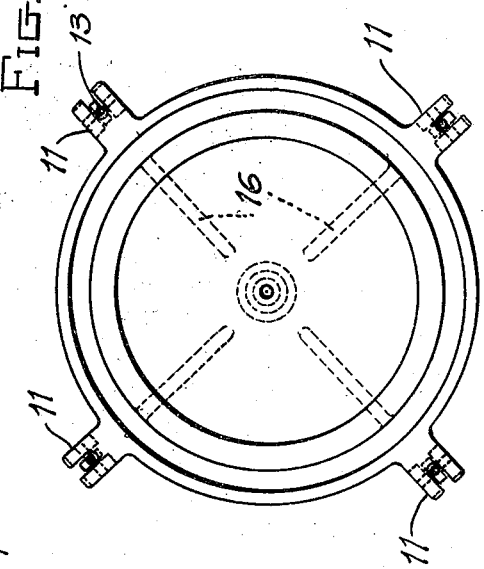
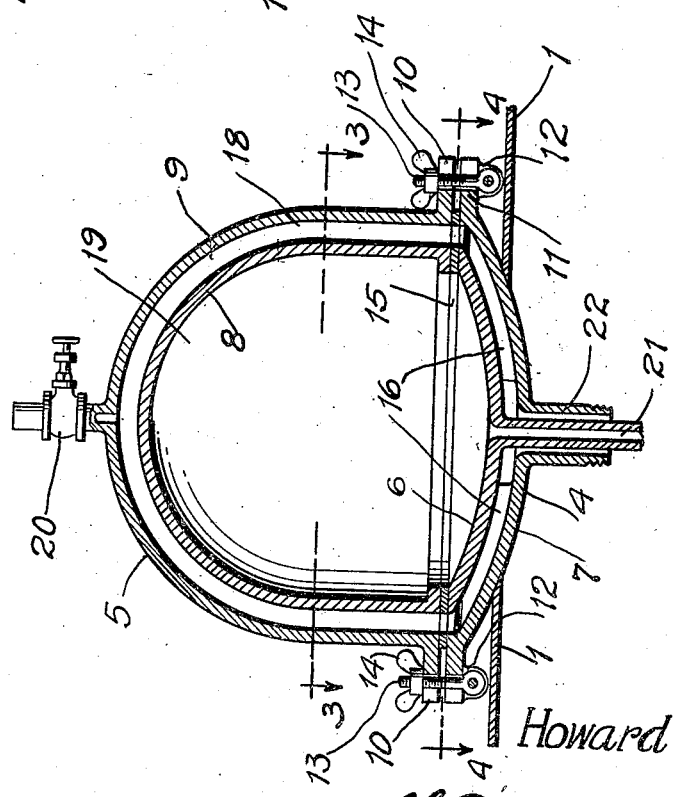
Inventor
Howard S. Brown
By H. B. Wilson &co
Attorneys Patented Oct. 3, 1922.

1,430,532

UNITED STATES PATENT OFFICE.

HOWARD S. BROWN, OF OASIS, UTAH.

STEAM COOKER.

Application filed July 21, 1921. Serial No. 486,539.

*To all whom it may concern:*

Be it known that I, HOWARD S. BROWN, a citizen of the United States, residing at Oasis, in the county of Millard and State of Utah, have invented certain new and useful Improvements in Steam Cookers; and I do declare the following to be a full, clear, and exact description of the invention, such as will enable others skilled in the art to which it appertains to make and use the same.

This invention relates to an improved steam heated cooker and one object of the invention is to provide a cooker which may be heated by steam admitted to a heating compartment surrounding the food compartments or which may be heated by steam admitted directly into the food compartments.

Another object of the invention is to so construct this cooker that steam may be admitted to the steam compartment and air forced out through an outlet having a controlling valve and a valve admitting steam and permitting escape of air then closed so that the steam can condense in the steam compartment surrounding the food compartments thus providing a vacuum serving to retain heat in the food compartments.

Another object of the invention is to provide a steam heated cooker in which the food compartment will be provided with a base and a removable head releasably held in engagement with the base and secured in air-tight engagement with the base through the medium of a gasket between the base and head and clamps carried by the base for engaging the hood.

Another object of the invention is to so construct this cooker that the steam pipes for admitting steam into the food compartment and steam compartment may also serve as outlet pipes for permitting water from condensed steam to drain out of the two compartments and back into the boiler.

Another object of the invention is to provide a cooker in which the food compartments may be mounted upon the upper portion of a frame and the boiler positioned in the frame below the food compartments and above a burner carried by the frame.

This invention is illustrated in the accompanying drawings, wherein:

Figure 1 is a view showing the improved cooker in front elevation.

Figure 2 is a vertical sectional view through one of the food compartments.

Figure 3 is a transverse sectional view taken along the line 3—3 of Fig. 2.

Figure 4 is a sectional view taken along the line 4—4 of Fig. 2 and showing the base portion of the food compartment in top plan.

This cooker is provided with a stand having a top 1, a base 2 and standards 3 for supporting the top above the base. In the form shown, the cooker will be provided with two food compartments, and the top will be provided with an opening for each of the food compartments. It is to be understood that the number of food compartments can be varied according to the size of stove to be constructed. Each of the food compartments is provided with a base 4 and a hood 5, the base having inner and outer walls 6 and 7 and the hood having inner and outer walls 8 and 9. The outer wall of the hood is provided with outstanding ears 10 which are slotted as shown in Fig. 3 and the outer wall of the base is provided with outstanding ears 11 which are slotted as shown in Fig. 4 and provided with depending bearings 12 to pivotally mount bolts 13 which may be swung upwardly through the slots of the ears 10 and 11 as shown in Fig. 2. When in this operative position shown in Fig. 2, the winged nuts 14 may be tightened and the hood will be drawn down into a secured position. A gasket 15 is placed between the base and hood and will provide an air and steam-tight joint between the base and hood when the clamps are tightened. Webs 16 are provided between the inner and outer walls of the base and the inner and outer walls of the hood and are connected by webs as shown in Fig. 3 thus providing passages 17 which will register with similar openings formed in the gasket 15 to permit the steam to pass from the base into the hood. By having the base and hood each provided with spaced inner and outer walls, there will be provided a steam compartment 18 which surrounds the food compartment 19. The steam compartment is provided with an outlet controlled by a valve 20 so that air may be forced out of this compartment by the steam. From an inspection of Figs. 1 and 2, it will be seen that the base is concaved and that at its lower point there will be provided pipe extensions 21 and 22, the pipe extension 22 being carried by the outer wall 7 of the base and the pipe extension 21 extending from the inner wall 6 of the base through the pipe extension 22, and as illustrated in Fig. 1, further extending through a coupling 23 at the lower end of this pipe extension 22.

A boiler 24 is positioned between the base and top 1 above the burner 25 and is provided with a water inlet pipe 26 and with steam outlet pipes 27 and 28. The outlet pipe 27 connects with a coupling 29 which carries a steam gauge 30 and has connection with pipes 31 leading to the couplings 23. Valves 32 are provided intermediate the coupling 29 and couplings 23 so that the flow of steam through the pipes 22 can be controlled. The pipes 28 are connected with the pipes 21 by valves 33. It will thus be seen that the flow of steam from the boiler into the food compartments 19 and steam compartments 18 can be controlled and further that by opening these valves, water formed by steam condensing in the food and steam compartments can flow back through these pipes into the boiler.

When this cooker is in use, water is placed in the boiler 24 and the water will be converted into steam. The gauge 30 indicates the steam pressure and if the steam pressure increases beyond the desired amount, the surplus steam will pass out through the safety valve 34. If it is desired to cook by steam, the articles to be cooked will be placed in the food compartments upon the base 4 and the hood or cover 5 will be put in place and secured by the fasteners. The proper valve 33 will be opened to admit steam to the food compartments having food placed therein and the steam will pass up into the food compartments to fill the same. It is of course understood that if food is placed in both of the food compartments shown, both of the valves 33 will be opened. After the food is cooked, the hood can be removed and the food removed from the compartments. When cooking in this compartment by means of steam, it is desired to retain the heat in the compartment and therefore before the valve 33 is opened the valve 20 of the hood 5 will first be opened and steam then admitted to the steam compartment through the pipes 22, the steam driving the air out of the steam compartment through the valve controlled outlet. As soon as steam comes out through the outlet, the valve 20 will be closed and the valve 32 will also be closed. The steam will then condense in this steam compartment and by condensing will create a vacuum. The valve 33 can then be opened to admit steam to the food compartment and the vacuum created between the inner and outer walls 8 and 9 will serve to retain the heat in the food compartment. It will thus be seen that the heat will be retained in the cooking compartment. If it is desired to cook by dry heat, the valve 20 will be opened and steam admitted to the steam compartment until steam comes out through the steam outlet. The valve 20 will then be closed and the valve 32 left open so that the steam compartment will be kept filled with steam. With the hood in place and the food compartment or steam compartment filled with steam, the cooker can be thoroughly sterilized and thus kept sanitary. When the burner 25 is extinguished and steam condenses in the food compartments or steam compartments, the water formed by the condensing steam may drain back into the boiler 24 when the valves 32 and 33 are opened. The water feed pipe 26 may be connected with a suitable source of water supply so that water can be fed into the boiler when necessary.

I claim:

1. A cooker comprising a cooking compartment having a base and a hood, each having spaced walls to provide a steam and vacuum chamber about the cooking compartment, a valve-controlled outlet for the steam chamber communicating with the same through the outer wall of said hood, a steam inlet pipe communicating with the steam chamber through the outer wall of said base, and a steam inlet pipe communicating with the cooking compartment through the first pipe and inner wall of said base.

2. A cooker comprising a frame, a cooking compartment carried by said frame and having a base and a hood each having spaced inner and outer walls providing a food compartment and a steam compartment surrounding the food compartment, a source of steam supply, a valve controlled pipe leading from the source of steam supply and communicating with the steam compartment through the outer wall of the base, a valve controlled pipe leading from the source of steam supply and communicating with the food compartment through the inner wall of said base and a valve controlled outlet for the steam compartment communicating through the outer wall of said hood at the upper end thereof.

3. A cooker comprising a frame, a food compartment carried by said frame and having a base and a removable hood, the hood and base each having spaced inner and outer walls to provide a steam compartment around the cooking compartment, the outer wall of the hood having a valve-controlled air and steam outlet, the outer wall of the base having a steam and water pipe leading therefrom and the inner wall of the base having a steam and water pipe extending through the pipe of the outer wall thereof whereby steam may enter the steam compartment and food compartment through said pipes and water formed by condensation pass out through said pipes, and a source of steam supply having valve controlled connection with said pipes.

4. The structure of claim 3 and a gasket between the base and hood provided with openings for the passage of steam from between the walls of the base into the space between the walls of the hood, and clamping means connecting the base and hood to compress the gasket between the same.

In testimony whereof I have hereunto set my hand.

HOWARD S. BROWN.